United States Patent
Koo

(10) Patent No.: US 8,911,911 B2
(45) Date of Patent: Dec. 16, 2014

(54) MEMBRANE HUMIDIFIER FOR FUEL CELL

(75) Inventor: Jin Woo Koo, Gyeonggi-Do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 550 days.

(21) Appl. No.: 12/760,960

(22) Filed: Apr. 15, 2010

(65) Prior Publication Data

US 2011/0129740 A1  Jun. 2, 2011

(30) Foreign Application Priority Data

Nov. 30, 2009  (KR) .................. 10-2009-0116435

(51) Int. Cl.
*H01M 8/06* (2006.01)
*H01M 8/04* (2006.01)
*H01M 8/10* (2006.01)

(52) U.S. Cl.
CPC ...... *H01M 8/04589* (2013.01); *H01M 8/04126* (2013.01); *H01M 8/04835* (2013.01); *H01M 2008/1095* (2013.01); *Y02E 60/50* (2013.01)
USPC ........... 429/408; 429/413; 429/414; 429/417; 429/450; 429/456

(58) Field of Classification Search
CPC ....................................... H01M 8/00
USPC .......................... 429/408, 413, 414, 417, 450
See application file for complete search history.

(56) References Cited

U.S. PATENT DOCUMENTS

| 6,939,629 B2 | 9/2005 | Katagiri et al. | |
| 2008/0093752 A1* | 4/2008 | Jeon ............................ | 261/100 |
| 2009/0226784 A1* | 9/2009 | Kim ............................ | 429/26 |

FOREIGN PATENT DOCUMENTS

| JP | 2007-328994 A | 12/2007 | |
| JP | 2008-226658 A | 9/2008 | |
| KR | 10-2009-0057773 | 6/2009 | |
| KR | 10-2009-0095696 | 9/2009 | |
| KR | 1020090095696 | * 9/2009 | ............. H01M 8/04 |

* cited by examiner

*Primary Examiner* — Patrick Ryan
*Assistant Examiner* — Ben Lewis
(74) *Attorney, Agent, or Firm* — Edwards Wildman Palmer LLP; Peter F. Corless

(57) ABSTRACT

In preferred aspect, the present invention features a membrane humidifier for a fuel cell which can control the amount of air flow and the amount of humidification based on the amount of water produced in a fuel cell stack according to a power level of the fuel cell stack while humidifying dry air and supplying humidified air to the fuel cell stack.

3 Claims, 4 Drawing Sheets

MEMBRANE HUMIDIFIER FOR FUEL CELL

CROSS-REFERENCE TO RELATED APPLICATION

This application claims under 35 U.S.C. §119(a) the benefit of Korean Patent Application No. 10-2009-0116435 filed Nov. 30, 2009, the entire contents of which are incorporated herein by reference.

BACKGROUND (a) Technical Field

The present disclosure relates, generally, to a membrane humidifier for a fuel cell. More particularly, it relates to a membrane humidifier for a fuel cell, which humidifies dry air by water exchange between the dry air and humid air discharged from a fuel cell stack and suitably supplies the humidified air to the fuel cell stack.

(b) Background Art

A fuel cell is an electricity generation system that does not convert chemical energy of fuel into heat by combustion, but electrochemically converts the chemical energy directly into electrical energy in a fuel cell stack. Such a fuel cell can be suitably applied to the supply of electric power for small-sized electrical/electronic devices such as portable devices, as well as to the supply of electric power for industry, homes, and vehicles, for example.

At present, a preferred fuel cell for a vehicle is a polymer electrolyte membrane fuel cell (PEMFC), also called a proton exchange membrane fuel cell, which preferably comprises: a membrane electrode assembly (MEA) including a polymer electrolyte membrane (PEM) for transporting hydrogen ions and an electrode catalyst layer, in which an electrochemical reaction takes place, suitably disposed on both sides of the PEM; a gas diffusion layer (GDL) for uniformly diffusing reactant gases and transmitting generated electricity; a gasket and a sealing member for suitably maintaining airtightness of the reactant gases and coolant and providing an appropriate bonding pressure; and a bipolar plate for transferring the reactant gases and coolant.

Preferably, in the fuel cell having the above-described configuration, hydrogen as a preferred fuel and oxygen (air) as a preferred oxidizing agent are suitably supplied to an anode and a cathode through flow fields of the bipolar plate, respectively. Preferably, the hydrogen is suitably supplied to the anode (that can also be called a "fuel electrode", "hydrogen electrode", and "oxidation electrode") and the oxygen (air) is suitably supplied to the cathode (that can also be called an "air electrode", "oxygen electrode", and "reduction electrode").

Preferably, the hydrogen supplied to the anode is dissociated into hydrogen ions (protons, $H^+$) and electrons ($e^-$) by catalyst of the electrode catalyst layer, where the catalyst is preferably provided on both sides of the electrolyte membrane. At this time, only the hydrogen ions are selectively transmitted to the cathode through the electrolyte membrane, which is preferably a cation exchange membrane and, at the same time, the electrons are transmitted to the anode through the GDL and the bipolar plate, which are conductors.

At the cathode, the hydrogen ions supplied through the electrolyte membrane and the electrons transmitted through the bipolar plate meet the oxygen in the air supplied to the cathode by an air supplier and cause a reaction that produces water. Due to the movement of hydrogen ions occurring at this time, the flow of electrons through an external conducting wire occurs, and thus a current is suitably generated.

Further, the PEMFC requires water for its operation and, since the water serves as a suitable transport medium for hydrogen ions, the humidity of reactant gases is directly related to the performance of the fuel cell. Therefore, the air (or oxygen) supplied to the cathode of the fuel cell is suitably humidified at an air inlet of the fuel cell stack by a humidifier.

Although there are various suitable humidification methods, such as bubbler, steam injection, adsorption, etc., a membrane humidifier having a relatively small volume is widely employed in the fuel cell vehicle due to limitations in terms of packaging. Accordingly, a membrane humidifier has a considerable advantage in that it does not require any power, as well as the advantage of its packaging.

Preferably, the membrane humidifier is suitably configured such that the dry air supplied to a cathode inlet of the fuel cell stack receives heat and water from hot and humid exhaust gas (humid air) discharged from the cathode outlet of the fuel cell stack. However, presently employed membrane humidifiers have reduced efficiency, are expensive to manufacture, or result in deterioration of the fuel cell, for example. Accordingly, there is a need in the art for improved membrane humidifiers for a fuel cell.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

In preferred aspects, the present invention features a membrane humidifier for a fuel cell with different types of hollow fiber membranes, which can effectively prevent an increase in pressure drop in the membrane humidifier and an increase in load of an air blower.

Preferably, the present invention provides a membrane humidifier for a fuel cell which can suitably control the amount of air flow and the amount of humidification based on the amount of water produced in a fuel cell stack according to a power level of the fuel cell stack.

In one preferred embodiment, the present invention provides a membrane humidifier for a fuel cell, the membrane humidifier preferably including a first hollow fiber membrane bundle including first hollow fiber membranes having a relatively high humidification performance; a second hollow fiber membrane bundle including second hollow fiber membranes having a relatively low humidification performance, the first and second hollow fiber membrane bundles being suitably arranged on one side and the other side of a housing; and a flow control device for suitably controlling the flow direction of dry air introduced into the housing to allow the dry air to pass through one of the first and second hollow fiber membranes according to a power level of a fuel cell stack.

In a preferred embodiment, the flow control device may allow the dry air to pass through the second hollow fiber membranes when the power level of the fuel cell stack is more than a predetermined reference value and allow the dry air to pass through the first hollow fiber membranes when the power level of the fuel cell stack is less than the reference value.

In another preferred embodiment, the flow control device may suitably increase the amount of dry air passing through the second hollow fiber membranes and suitably reduce the amount of dry air passing through the first hollow fiber membranes when the power level of the fuel cell stack is suitably increased.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
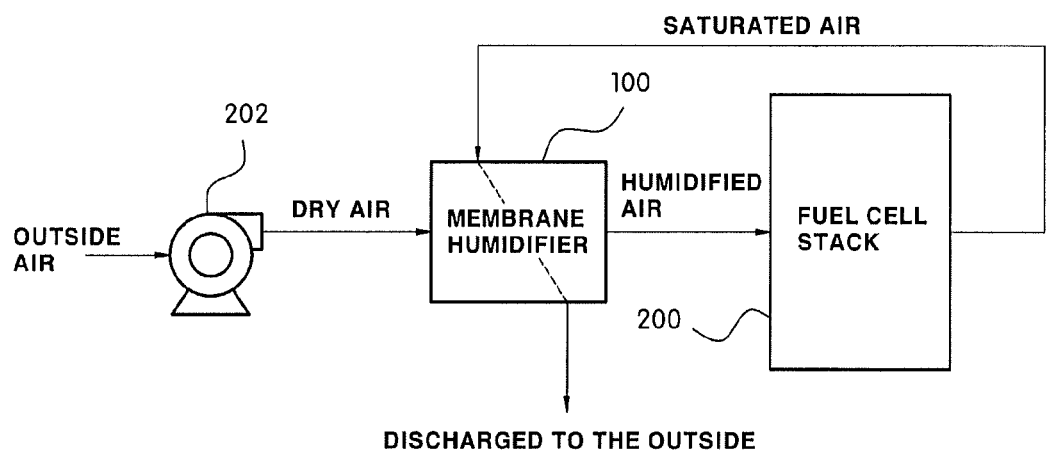
FIG. 1 is a schematic diagram showing a typical air supply system in a fuel cell system.

Reference numerals set forth in the Drawings includes reference to the following elements as further discussed below:

| | |
|---|---|
| 100: membrane humidifier | 101: housing |
| 110: first hollow fiber membrane bundle | |
| 111: first hollow fiber membrane | 112: potting portion |
| 120: second hollow fiber membrane bundle | |
| 121: second hollow fiber membrane | 131: motor |
| 132: rotating shaft | 133: flow guide |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

In preferred aspects, the present invention features a membrane humidifier for a fuel cell comprising a first hollow fiber membrane bundle comprising first hollow fiber membranes having a relatively high humidification performance, a second hollow fiber membrane bundle comprising second hollow fiber membranes having a relatively low humidification performance, and a flow control device.

In one preferred embodiment, the first and second hollow fiber membrane bundles are arranged on one side and the other side of a housing.

In another preferred embodiment, the flow control device controls the flow direction of dry air introduced into the housing and allows the dry air to pass through one of the first and second hollow fiber membranes according to a power level of a fuel cell stack.

FIG. 1 is a schematic diagram showing a typical air supply system in an exemplary fuel cell system, which humidifies air using the above-described membrane humidifier and supplies humidified air to a fuel cell stack. As shown in the figure, a membrane humidifier 100 which performs humidification by water exchange between dry air and humid air is used.

Preferably, outside dry air is forcibly supplied into the membrane humidifier 100 by an air blower 202 and, at this time, oversaturated humid air containing water discharged from a cathode outlet of a fuel cell stack 200 passes through the membrane humidifier 100 such that the dry air is suitably humidified by water exchange between the oversaturated humid air and the dry air and the humidified air is supplied to a cathode inlet of the fuel cell stack 200.

Typically, hollow fiber membranes are preferably used in the membrane humidifier. In the membrane humidifier, the hollow fiber membranes having a high contact surface area can be highly integrated, and thus it is possible to provide sufficient humidification to the fuel cell stack with a suitably small capacity. Moreover, since the water and heat contained in the gas discharged from the cathode outlet of the fuel cell stack are collected and reused by the membrane humidifier, it is possible to save water and energy consumed for the humidification.

Preferably, the membrane humidifier has a structure in which a water-permeable hollow fiber membrane bundle is inserted into a housing. In the housing, the dry air supplied by the air blower passes through the inside of the hollow fiber membranes, and the exhaust gas (humid air) discharged from the cathode outlet of the fuel cell stack passes through the outside of the hollow fiber membranes.

Figure 2:
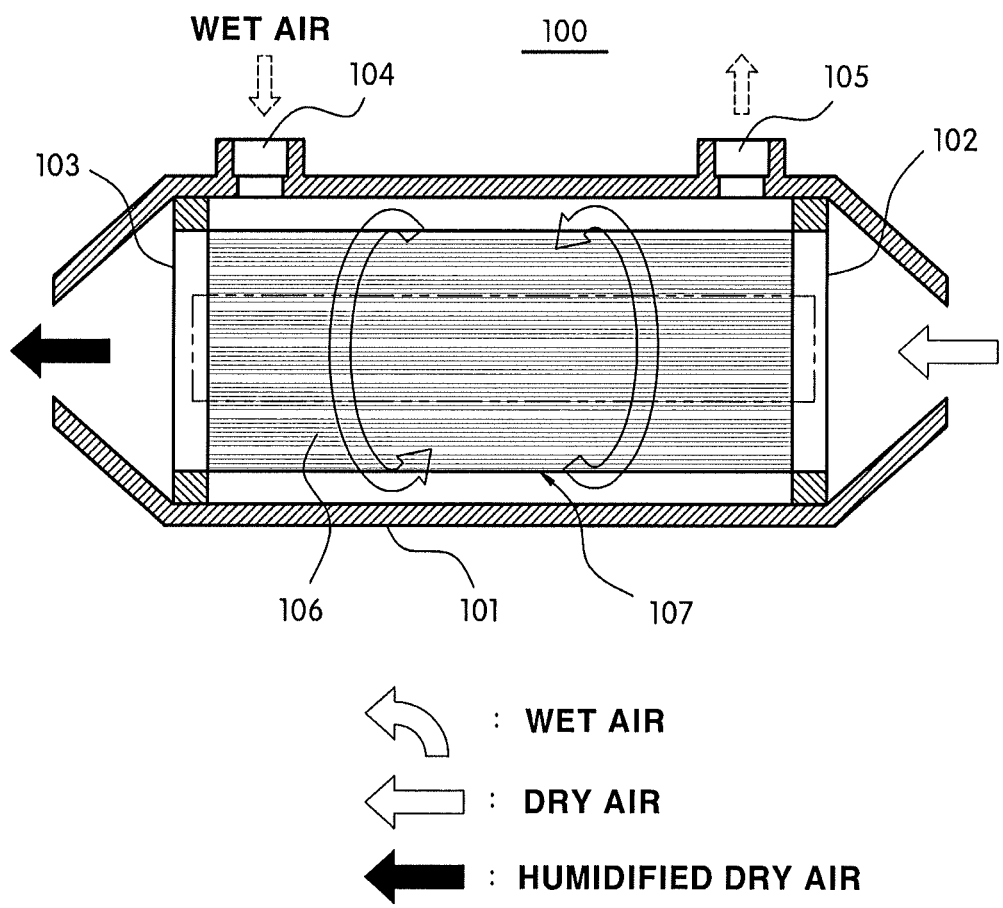
FIG. 2 is a schematic diagram showing the exemplary configuration and operation of a typical membrane humidifier for a fuel cell.

FIG. 2 is an exemplary cross-sectional view showing the configuration of a membrane humidifier using hollow fiber membranes.

As shown in the figure, the membrane humidifier 100 preferably includes a housing 101. The housing 101 includes a first inlet 102 through which dry air is introduced, a first outlet 103 through which humidified air is suitably discharged, a second inlet 104 through which exhaust gas is introduced, and a second outlet 105 through which the exhaust gas is suitably discharged.

Further, a hollow fiber membrane module 107 is suitably disposed in the housing 101, and the hollow fiber membrane module 107 comprises a plurality of hollow fiber membranes 106.

In the membrane humidifier 100 with the above-described configuration, when exhaust gas (humid air) discharged from the fuel cell stack is suitably supplied to the inside of the housing 101 through the second inlet 104, the water in the exhaust gas is separated by capillary action of the hollow fiber membranes 106, and the separated water is condensed while passing through capillary tubes of the hollow fiber membranes 106. Accordingly, the exhaust gas, from which water is separated, is suitably discharged to the outside through the second outlet 105 of the housing 101.

Further, outside air (dry air) is suitably supplied through the first inlet 102 of the housing 101 by the operation of the air blower and passes through the hollow fiber membranes 106. Accordingly, since the water separated from the exhaust gas is collected in the hollow fiber membranes 106, the dry air is humidified by the water and then suitably supplied to the fuel cell stack through the first outlet 103.

However, as shown in FIG. 2, since the plurality of hollow fiber membranes 106 are concentrated in the hollow fiber membrane module 107, it is difficult for the exhaust gas (humid air) introduced through the second inlet 104 to suitably permeate through the hollow fiber membrane module 107.

Further, the humid air (exhaust gas) passing through the outside of the hollow fiber membrane module 107 accommodated in the housing 101 does not suitably penetrate into the center of the hollow fiber membrane module 107 as shown in the dotted line box of FIG. 2 but mainly flows along the periphery of the hollow fiber membrane module 107 as shown by the arrows of FIG. 2.

Accordingly, the rate at which the humid air is diffused into the hollow fiber membrane module 107 is suitably reduced, which decreases the humidification efficiency. As a result, the hollow fiber membranes located in the center of the hollow fiber membrane module 107 cannot be supplied with sufficient water, and thereby the overall efficiency of the membrane humidifier is reduced.

Moreover, in the conventional membrane humidifier, the dry air introduced through the first inlet 102 mainly flows through the center (as shown in the dotted line box of FIG. 2) of the hollow fiber membrane module 107, and thereby the efficiency of the membrane humidifier is further reduced.

Such a problem can become more serous when the amount of dry air is large, i.e., when the fuel cell stack produces high power output.

In most cases, sufficient humidification is required in a low current region of the fuel cell system, and sufficient water is produced in high power and high current regions to the extent that the cathode does not require humidification. Nevertheless, in most of the conventional membrane humidifiers, the dry air is passed through the hollow fiber membranes regardless of the amount of humidification in both the low and high current regions. Further, in cases where the hollow fiber membranes are made of only Nafion, a high humidity of more than 80% RH is provided even in the high current region.

Since a large amount of water is produced and a high humidity is provided in the high current region of the fuel cell system, an increase in resistance of cathode material transfer and a flooding phenomenon may occur, which results in air starvation of the cathode. Accordingly, the deterioration of the fuel cell catalyst is accelerated and thus the durability of the fuel cell is suitably reduced.

Figure 3:
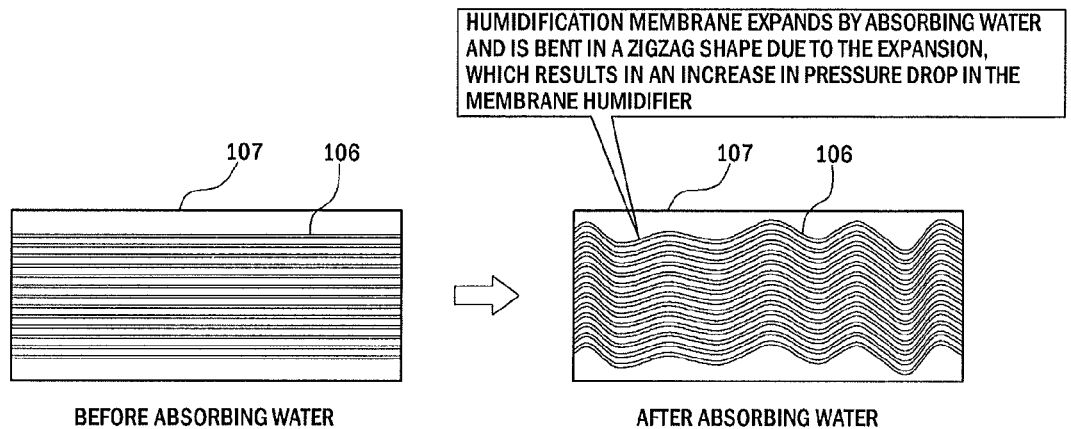
FIG. 3 is a schematic diagram illustrating an exemplary problem of a conventional membrane humidifier.

Moreover, in examples where hollow fiber membranes made of Nafion are used in the whole hollow fiber membrane bundle, the hollow fiber membranes expand by absorbing water due to their characteristics, and the hollow fiber membranes are not stretched in the longitudinal direction thereof but rather bent in a zigzag shape due to the expansion, for example as shown in FIG. 3. As a result, the pressure drop in the membrane humidifier is suitably increased, and thereby the load applied to the air blower for supplying air to the membrane humidifier is also suitably increased.

Furthermore, since the hollow fiber membranes made of Nafion are very expensive, the manufacturing cost is increased.

Accordingly, Korean Patent Publication No. 10-2009-0095696, incorporated by reference in its entirety herein, discloses a membrane humidifier for a fuel cell, in which different types of hollow fiber membranes are preferably used. In this membrane humidifier, first hollow fiber membranes, which have a higher humidification performance and are swollen with water, are suitably arranged in the center of a hollow fiber membrane bundle, through which dry air mainly flows, and second hollow fiber membranes, which have a lower high humidification performance than the first hollow fiber membranes and are not swollen with water, are suitably disposed on the outside of the first hollow fiber membranes, through which exhaust gas (humid air) discharged from a fuel cell stack mainly flows, so as to provide the same humidification performance as the conventional membrane humidifier and prevent an increase in pressure drop in the membrane humidifier and an increase in load of the air blower.

Further, the above-described membrane humidifier can prevent the occurrence of flooding phenomenon in the high power region, in which a large amount of water is produced in the fuel cell stack itself.

In the above-described arrangement of the hollow fiber membranes, the first hollow fiber membranes arranged in the center of the hollow fiber membrane bundle are preferably formed of Nafion, and the second hollow fiber membranes disposed on the outside of the first hollow fiber membranes are preferably formed of polyetherimide or polyphenylsulfone, thus providing a membrane humidifier which is advantageous in terms of manufacturing cost.

However, in the membrane humidifier using the different types of hollow fiber membranes, even though the hollow fiber membranes formed of Nafion are suitably arranged in the center of the hollow fiber membrane bundle and the hollow fiber membranes formed of polyetherimide or polyphenylsulfone are suitably disposed on the outside of the first hollow fiber membranes, the dry air introduced through an inlet of the membrane humidifier does not selectively pass through one of the two types of hollow fiber membranes according to the output power of the fuel cell stack, and thus it is difficult to achieve the desired effect.

In particular, the phenomenon that the hollow fiber membranes formed of Nafion expanding by absorbing water are not stretched in the longitudinal direction but rather bent in a zigzag shape still occurs, and thus it is still difficult to suitably prevent the increase in the pressure drop in the membrane humidifier and the increase in the load of the air blower.

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 4:
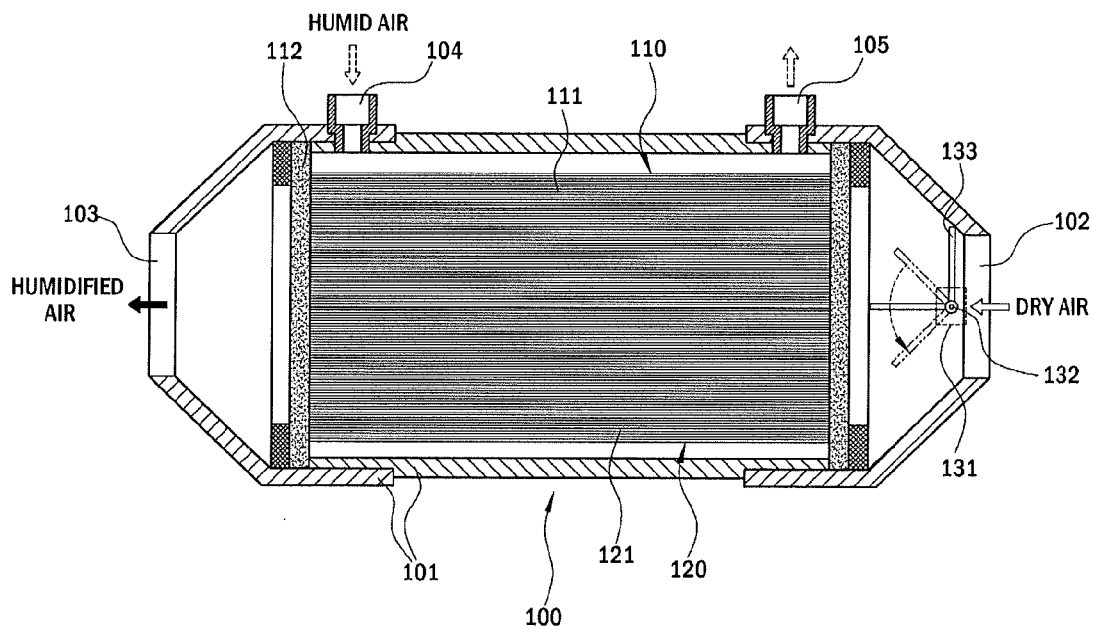
FIG. 4 is a longitudinal cross-sectional view showing the configuration of a membrane humidifier for a fuel cell in accordance with an exemplary embodiment of the present invention.
Figure 5:
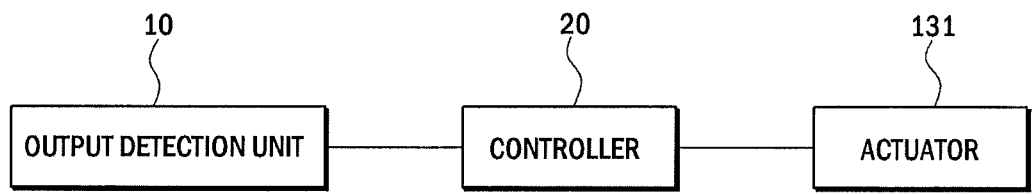
FIG. 5 is a block diagram showing the configuration of a flow control device in a membrane humidifier for a fuel cell in accordance with an exemplary embodiment of the present invention.

FIG. 4 is a longitudinal cross-sectional view showing the configuration of a membrane humidifier for a fuel cell in accordance with an exemplary embodiment of the present invention. FIG. 5 is a block diagram showing the configuration of a flow control device in a membrane humidifier for a fuel cell in accordance with another exemplary embodiment of the present invention.

In one preferred embodiment, the membrane humidifier 100 in accordance with the present invention employs different types of hollow fiber membranes, in which a plurality of first hollow fiber membranes 111, which have a higher humidification performance and are preferably swollen with water, are suitably arranged on one side of the cross section of a housing 101, and a plurality of second hollow fiber membrane 121, which have a lower humidification performance than the first hollow fiber membranes 111 and are preferably not swollen with water (i.e., slightly swollen), are suitably disposed on the other side of the cross section of the housing 101.

Preferably, the first hollow fiber membranes 111 may be suitably formed of Nafion and the second hollow fiber membranes 121 may be suitably formed of polyetherimide or polyphenylsulfone.

According to certain preferred embodiments, when the hollow fiber membranes formed of polyetherimide or polyphenylsulfone, which is relatively inexpensive, are used in a hollow fiber membrane bundle, it is possible to suitably manufacture a membrane humidifier which is advantageous in terms of manufacturing cost, when compared to a membrane humidifier in which the whole hollow fiber membrane bundle is formed of Nafion.

In another preferred embodiment, the first hollow fiber membranes 111 and the second hollow fiber membranes 121 are suitably arranged on one side and the other side of the housing 101 such that a hollow fiber membrane bundle 110 including the first hollow fiber membranes 111 and a hollow fiber membrane bundle 120 including the second hollow fiber membranes 121 preferably have a semicircular cross section, respectively. Accordingly, in preferred embodiments, the hollow fiber membrane bundle including the first and second hollow fiber membranes 111 and 121 preferably has a circular cross section, in which the first hollow fiber membranes 111 are suitably disposed in a semicircular cross-sectional area and the second hollow fiber membranes 121 are suitably disposed in the remaining semicircular cross-sectional area.

According to further exemplary embodiments of the present invention, for example as shown in FIG. 4, the hollow fiber membrane bundle 110 (hereinafter referred to as a first hollow fiber membrane bundle) including the first hollow fiber membranes 111 is suitably disposed on one side of the housing 101 and the hollow fiber membrane bundle 120 (hereinafter referred to as a second hollow fiber membrane bundle) including the second hollow fiber membranes 121 is suitably disposed on the other side of the housing 101.

Accordingly, the first hollow fiber membrane bundle 110 and the second hollow fiber membrane bundle 120 are suitably arranged side by side in the housing 101 such that dry air introduced through an inlet 102 of the housing 101 is preferably passed through one of the first and second hollow fiber membrane bundles 110 and 120 by a flow guide 133, described herein.

Preferably, although the first and second hollow fiber membrane bundles 110 and 120 in the whole hollow fiber membrane bundle accommodated in the housing 101 are suitably divided into halves, the number and arrangement of the first and second hollow fiber membrane bundles 110 and 120 may preferably be modified in various ways.

For example, in certain preferred embodiments, the first and second hollow fiber membrane bundles 110 and 120 in the whole hollow fiber membrane bundle may be suitably divided into one-third and two-thirds or two-fifths and three-fifths and arranged on one side and the other side of the cross section of the housing 101.

Preferably, both ends of the hollow fiber membrane bundle are potted with a potting material and integrally fixed. In further preferred embodiments, in the membrane humidifier of the present invention, a potting portion 112 is formed on both sides of the hollow fiber membrane bundles 110 and 120.

Preferably, a potting process is suitably performed in such a manner that both ends of each hollow fiber membrane is potted with a polymer potting material, the polymer potting material is preferably dried and cured, and both ends of the potted hollow fiber membrane bundle are cut by a cutter to expose an outlet and an inlet of each hollow fiber membrane so as not to be blocked by the potting material.

Further, the membrane humidifier 100 of the present invention preferably includes a flow control device which controls the flow direction of the dry air introduced to the housing 101 according to a power level of the fuel cell stack to selectively pass the dry air through one of the first hollow fiber membranes 111 and the second hollow fiber membranes 121.

According to further preferred embodiments, the flow control device includes an output detection unit 10 for suitably detecting a power level of the fuel cell stack, a controller 20 for suitably outputting a control signal for controlling the flow direction of the dry air according to the power level detected by the output detection unit 10, and a flow setting means for suitably setting the flow direction of the dry air according to the control signal applied from the controller 20.

Preferably, in certain exemplary embodiments, for example as shown in FIG. 4, the flow setting preferably means includes a flow guide 133 rotatably mounted at an inlet portion of the housing 101 and setting the path of dry air according to the rotational position and an actuator 131 for rotating the flow guide 133.

Preferably, the flow guide 133 controls the flow direction of dry air introduced through the inlet portion of the housing 101 by an air blower such that the dry air flows through one of an inlet of the first hollow fiber membrane bundle 110 and an inlet of the second hollow fiber membrane bundle 120.

Accordingly, in further preferred embodiments, the flow guide 133 selectively controls the flow path of dry air by opening and closing one of the flow path of the first hollow fiber membrane bundle 110 (preferably, such that the dry air flows into the first hollow fiber membranes) and the flow path of the second hollow fiber membrane bundle 120 (preferably, such that the dry air flows into the second hollow fiber membranes).

According to further preferred embodiments, the actuator 131 may be a small motor driven according to a control signal of the controller 20, e.g., preferably a fuel cell system controller. Preferably, the motor 131 may be fixedly mounted on the outside of the inlet port of the housing 101 of the membrane humidifier 100, and a rotating shaft 132 of the motor 131 is integrally connected to the flow guide 133 in the inside of the housing 101.

According to exemplary embodiments, in the above-described preferred configuration, the controller 20 suitably outputs a control signal for controlling the flow direction of dry air based on a detection signal of the output detection unit 10 for detecting a power level of the fuel cell stack. Preferably, when the output power of the fuel cell stack is more than a predetermined reference value, the controller 20 controls the operation of the motor 131 such that the dry air introduced through the inlet 102 of the housing 101 passes through the second hollow fiber membrane bundle 120.

In still other embodiments, when the output power of the fuel cell stack is less than the reference value, the controller 20 controls the operation of the motor 131 such that the dry air introduced through the inlet 102 of the housing 101 passes through the first hollow fiber membrane bundle 110.

Preferably, then, the flow guide 133 is suitably rotated by the operation of the motor 131 controlled by the controller 20 to determine the flow direction of dry air. According to the rotational position of the flow guide 133, the dry air flows into the second hollow fiber membranes 121 when the power level of the fuel cell stack is suitably high and passes through the first hollow fiber membranes 111 when the power level of the fuel cell stack is suitably low, thus being humidified.

Accordingly, the dry air is passed through the hollow fiber membranes formed of polyetherimide or polyphenylsulfone when the power level of the fuel cell stack is suitably high and passed through the hollow fiber membranes formed of Nafion when the power level of the fuel cell stack is suitably low.

Preferably, the output power detection 10 for detecting a power level of the fuel cell stack may be a current sensor for detecting a current flowing from the fuel cell stack, and the controller 20 preferably passes the dry air through the second hollow fiber membrane bundle 120 in a high current region where a detection value of the current sensor is more than a reference value and passes the dry air through the first hollow fiber membrane bundle 110 in a low current region where the detection value of the current sensor is suitably less than the reference value.

Accordingly, the dry air passes through the flow path selected from the first hollow fiber membranes 111 and the second hollow fiber membranes 121 arranged in parallel in the membrane humidifier 100, in which different types of hollow fiber membranes are preferably used, according to the power level of the fuel cell stack. Preferably, in a low power region, it is necessary to supply a large amount of water to the fuel cell stack, and thus the dry air is preferably passed through the first hollow fiber membranes 111 formed of Nafion having a relatively high humidification performance so as to absorb the water from the exhaust gas (humid air) as much as possible. In certain preferred embodiments, in a high power region, a large amount of water is suitably produced in the fuel cell stack, and thus the dry air is passed through the second hollow fiber membranes 121 formed of polyetherimide or polyphenylsulfone having a relatively low humidification performance so as to suitably supply water to the fuel cell stack in accordance with the condition of the fuel cell stack, thus suitably preventing the occurrence of flooding phenomenon.

Accordingly, as a result, since the amount of water required is different depending upon the power level of the fuel cell stack, it is possible to suitably supply an appropriate amount of water to the fuel cell stack in accordance with the condition of the fuel cell stack, and it is also possible to actively control the amounts of air and water supplied to the fuel cell stack according to the power level of the fuel cell stack.

In further preferred embodiments of the present invention, the first hollow fiber membrane bundle 110 and the second hollow fiber membrane bundle 120 each having a semicircular cross section, are suitably arranged on one side and the other side of the housing 101, not on the inside and outside of the housing 101, and the flow guide 133 for controlling the flow direction of air is suitably provided such that the dry air is passed through one of the first hollow fiber membrane bundle 110 and the second hollow fiber membrane bundle 120 according to the power level of the fuel cell stack. Accordingly, it is possible to suitably increase the contact between the dry air and the exhaust gas (humid air) compared to the conventional membrane humidifier, and thus it is possible to suitably improve the humidification efficiency by increasing the rate at which the exhaust gas is diffused into the hollow fiber membranes.

Preferably, although the flow guide 133 controls the flow direction of dry air such that the dry air is suitably passed through one of the different types of hollow fiber membrane bundles 110 and 120 in the above description, the controller 20 may more precisely control the rotation of the motor 131 and the position of the flow guide 133 according to the power level of the fuel cell stack.

In certain preferred embodiments, for example in this case, the controller 20 more precisely controls the rotational position of the flow guide 133 such that the opening degree of the flow paths connected to the two hollow fiber membrane bundles 110 and 120 can be suitably controlled according to the power level of the fuel cell stack. Accordingly, it is possible to appropriately control the amount of dry air flowing through the first and second hollow fiber membrane bundles 110 and 120.

In certain exemplary embodiments, when the power level of the fuel cell stack is higher, the amount of dry air flowing through the second hollow fiber membrane bundle 120 is suitably increased and the amount of dry air flowing through the first hollow fiber membrane bundle 110 is suitably reduced. In other certain embodiments, when the power level of the fuel cell stack is lower, the amount of dry air flowing through the first hollow fiber membrane bundle 110 is suitably increased and the amount of dry air flowing through the second hollow fiber membrane bundle 120 is suitably reduced.

Further, it is possible to allow the dry air to pass through all of the first and second hollow fiber membrane bundles 110 and 120 by placing the flow guide 133 in a neutral position.

Accordingly, it is possible to suitably control the amounts of air and water to meet the conditions required by the fuel cell stack by preferably changing the rotational position and angle of the flow guide 133 according to the power level of the fuel cell stack.

As described herein, according to the membrane humidifier of the present invention, in which different types of hollow fiber membranes, which can effectively prevent the increase in the pressure drop in the membrane humidifier (i.e., differential pressure between the inlet and outlet) and the increase in the load of the air blower, are used, and the flow control device for suitably allowing the dry air supplied by the air blower to selectively flow through the different types of hollow fiber membranes is provided, it is possible to suitably control the amount of air flowing through the different types of hollow fiber membranes and the amount of humidification according to the power level of the fuel cell stack.

In particular preferred embodiments of the present invention, since the amount of water required is different depending upon the power level of the fuel cell stack, it is possible to suitably supply an appropriate amount of water to the fuel cell stack in accordance with the condition of the fuel cell stack.

Further, it is possible to suitably increase the contact between the dry air and the humid air compared to the conventional membrane humidifier, and thus it is possible to suitably improve the humidification efficiency by increasing the rate at which the humid air is diffused into the hollow fiber membranes.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A membrane humidifier for a fuel cell, the membrane humidifier comprising:
   a first hollow fiber membrane bundle including first hollow fiber membranes having a first humidification performance;
   a second hollow fiber membrane bundle including second hollow fiber membranes having a humidification performance relatively lower than the first humidification performance, the first hollow fiber membrane bundle being arranged on one side of a housing of the membrane humidifier and the second hollow fiber membrane bundle being arranged in parallel with the first hollow fiber membrane bundle on the other side of the housing of the membrane humidifier so that the first hollow membrane bundle and the second hollow membrane bundle are in a same chamber of the housing; and
   a flow control device, disposed in a dry air inlet the membrane humidifier, that controls the flow direction of dry air introduced into the housing to allow the dry air to pass through one of the first and second hollow fiber membranes according to a power level of a fuel cell stack,
   wherein the first hollow fiber membranes are formed of a sulfonated tetrafluoroethylene based fluoropolymer-copolymer, which expand by absorbing water, and the second hollow fiber membranes are formed of polyetherimide or polyphenylsulfone which are less expanded than the sulfonated tetrafluoroethylene based fluoropolymer-copolymer,
   wherein the flow control device further comprises:
      an output detection unit configured to detect a power level of the fuel cell stack,
      a controller configured to output a control signal that controls the flow direction of dry air according to the power level detected by the output detection unit, and
      a flow setting means configured to set the flow direction of dry air according to the control signal applied from the controller, wherein the flow setting means comprises:
         a flow guide rotatably mounted at an inlet portion of the housing to set the path of dry air according to the rotational position of the flow guide, and
         an actuator operably disposed to rotate the flow guide,
      wherein the flow control device is controlled by the controller to allow the dry air to pass through the second hollow fiber membranes when the power level of the fuel cell stack is more than a predetermined reference value and allow the dry air to pass through the first hollow fiber membranes when the power level of the fuel cell stack is less than the reference value.

2. The membrane humidifier of claim 1, wherein the actuator is a motor fixedly mounted on the outside of the inlet port of the housing and a rotating shaft of the motor is integrally connected to the flow guide.

3. The membrane humidifier of claim 1, wherein the flow control device increases the amount of dry air passing through the second hollow fiber membranes and reduces the amount of dry air passing through the first hollow fiber membranes when the power level of the fuel cell stack is increased.

* * * * *